United States Patent
Modzelewski et al.

(10) Patent No.: US 10,285,052 B2
(45) Date of Patent: *May 7, 2019

(54) WIRELESS PAIRING OF PERSONAL HEALTH DEVICE WITH A COMPUTING DEVICE

(71) Applicant: Trividia Health, Inc., Ft. Lauderdale, FL (US)

(72) Inventors: Brent E. Modzelewski, Boca Raton, FL (US); Steven V. Leone, Lake Worth, FL (US)

(73) Assignee: Trividia Health, Inc., Fort Lauderdale, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/878,559

(22) Filed: Jan. 24, 2018

(65) Prior Publication Data

US 2018/0152837 A1 May 31, 2018

Related U.S. Application Data

(63) Continuation of application No. 15/480,937, filed on Apr. 6, 2017, now Pat. No. 9,913,138, which is a
(Continued)

(51) Int. Cl.
*H04L 29/06* (2006.01)
*H04W 12/04* (2009.01)
*G06F 19/00* (2018.01)

(52) U.S. Cl.
CPC ............ *H04W 12/04* (2013.01); *G06F 19/00* (2013.01); *H04L 63/0435* (2013.01);
(Continued)

(58) Field of Classification Search
CPC ...................................................... H04L 63/061
(Continued)

(56) References Cited

U.S. PATENT DOCUMENTS 6,772,331 B1 8/2004 Hind et al.
7,991,694 B2 * 8/2011 Takayama .............. G06Q 20/04
705/41

(Continued)

FOREIGN PATENT DOCUMENTS

AU 2014248600 9/2015
AU 2017248540 11/2017
(Continued)

OTHER PUBLICATIONS

Kalman, G. et al., "Security for Ambient Wireless Services", IEEEVTS Vehicular Technology Conference Proceedings, IEEE, pp. 298-303, Apr. 1, 2007.
(Continued)

*Primary Examiner* — Ali Shayanfar
(74) *Attorney, Agent, or Firm* — Greenberg Traurig, LLP; David J. Dykeman; Roman Fayerberg

(57) ABSTRACT

Systems and methods for the wireless pairing of a personal health device (PHD) (e.g., blood glucose monitor) with a computing device (e.g., smartphone) are disclosed herein. In an embodiment, the PHD communicates a private key to the computing device via a first communication medium (e.g., light signal, audio signal, pattern). The PHD receives from the computing device via a second wireless communication medium (e.g., Bluetooth® or WiFi) pairing information including the private key. The PHD can then establish a secure communication channel with the computing device by pairing the PHD to the computing device.

17 Claims, 10 Drawing Sheets

Related U.S. Application Data continuation of application No. 14/206,077, filed on Mar. 12, 2014, now Pat. No. 9,762,558.

(60) Provisional application No. 61/777,467, filed on Mar. 12, 2013.

(52) U.S. Cl.
CPC ........ H04L 63/0492 (2013.01); H04L 63/061 (2013.01); H04L 63/18 (2013.01)

(58) Field of Classification Search
USPC .......................................................... 713/171
See application file for complete search history.

(56) References Cited

U.S. PATENT DOCUMENTS

| | | | |
|---|---|---|---|
| 8,666,313 B2 | 3/2014 | Preston et al. | |
| 8,719,568 B1 | 5/2014 | Antypas, III | |
| 8,739,260 B1 | 5/2014 | Damm-Goossens | |
| 9,098,703 B2 | 8/2015 | Yoo | |
| 9,413,753 B2 | 8/2016 | Dietrich et al. | |
| 9,414,776 B2* | 8/2016 | Sillay | A61B 5/11 |
| 9,762,558 B2 | 9/2017 | Modzelewski et al. | |
| 2002/0044552 A1* | 4/2002 | Vialen | H04W 12/06 370/389 |
| 2004/0097217 A1 | 5/2004 | McClain | |
| 2005/0102167 A1* | 5/2005 | Kapoor | A61B 5/0006 705/3 |
| 2005/0246533 A1* | 11/2005 | Gentry | H04L 9/0836 713/170 |
| 2006/0291664 A1* | 12/2006 | Suarez | G06F 21/33 380/286 |
| 2007/0249375 A1 | 10/2007 | Zapata et al. | |
| 2008/0013601 A1 | 1/2008 | Lind et al. | |
| 2008/0016537 A1 | 1/2008 | Little et al. | |
| 2008/0065892 A1 | 3/2008 | Bailey et al. | |
| 2008/0121710 A1* | 5/2008 | Haddock | G06K 19/16 235/454 |
| 2009/0058635 A1* | 3/2009 | LaLonde | A61N 1/37282 340/539.11 |
| 2009/0058636 A1 | 3/2009 | Gaskill et al. | |
| 2010/0016704 A1* | 1/2010 | Naber | A61B 3/16 600/398 |
| 2011/0081860 A1 | 4/2011 | Brown et al. | |
| 2011/0183614 A1 | 7/2011 | Tamura | |
| 2012/0045994 A1 | 2/2012 | Koh et al. | |
| 2012/0128154 A1* | 5/2012 | Ran | H04K 1/00 380/255 |
| 2012/0137315 A1 | 5/2012 | Christopher et al. | |
| 2012/0275595 A1* | 11/2012 | Emelko | H04L 9/0897 380/44 |
| 2012/0314865 A1 | 12/2012 | Kitchen | |
| 2013/0029596 A1 | 1/2013 | Preston et al. | |
| 2013/0059541 A1* | 3/2013 | Sloan | G06Q 50/24 455/41.2 |
| 2013/0198522 A1 | 8/2013 | Kohno et al. | |
| 2013/0230171 A1* | 9/2013 | Ivanchykhin | H04L 63/108 380/259 |
| 2013/0298208 A1* | 11/2013 | Ayed | G06F 21/00 726/6 |
| 2014/0133656 A1* | 5/2014 | Wurster | H04L 9/0637 380/270 |
| 2014/0156285 A1* | 6/2014 | Jax | G10L 19/018 704/500 |
| 2014/0257047 A1 | 9/2014 | Sillay | |
| 2014/0258132 A1* | 9/2014 | Swamy | G06K 7/0004 705/67 |
| 2014/0281547 A1 | 9/2014 | Modzelewski et al. | |
| 2014/0286491 A1* | 9/2014 | Atherton | G06K 7/10267 380/270 |

FOREIGN PATENT DOCUMENTS

| | | |
|---|---|---|
| JP | 2005167946 | 6/2005 |
| JP | 2007166568 | 6/2007 |
| JP | 2009532706 A5 | 3/2010 |
| JP | 2012060242 A | 3/2012 |
| WO | 2006018952 | 2/2006 |
| WO | 2014165172 | 10/2014 |

OTHER PUBLICATIONS

Extended European Search Report issued in European Application No. 14779700.5 dated Sep. 23, 2016.
PCT International Search Report based on PCT/US2014/024643 dated Aug. 1, 2014.
Office Action in U.S. Appl. No. 14/206,077 dated Jul. 12, 2016.
Office Action in U.S. Appl. No. 14/206,077 dated Feb. 23, 2016.
Office Action in U.S. Appl. No. 14/206,077 dated Oct. 30, 2015.
Office Action in U.S. Appl. No. 14/206,077 dated Jun. 3, 2015.
Office Action in U.S. Appl. No. 15/480,937 dated Jun. 29, 2017.

\* cited by examiner

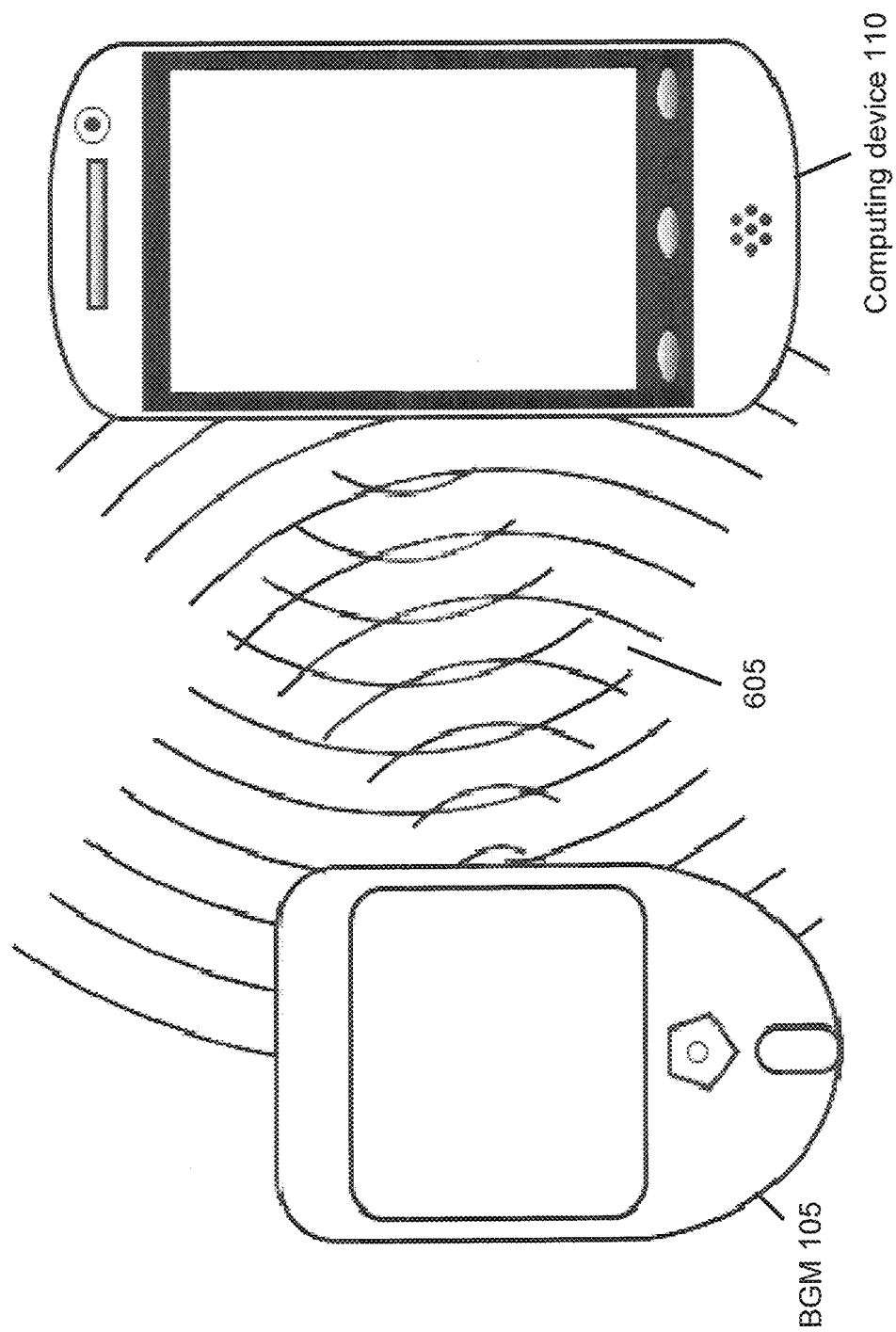

WIRELESS PAIRING OF PERSONAL HEALTH DEVICE WITH A COMPUTING DEVICE

CROSS REFERENCE TO RELATED APPLICATIONS

This patent application is a continuation of U.S. patent application Ser. No. 15/480,937, titled "Wireless Pairing of Personal Health Device with a Computing Device,", filed Apr. 6, 2017, which is a continuation of U.S. patent application Ser. No. 14/206,077, titled "Wireless Pairing of Personal Health Device with a Computing Device," filed Mar. 12, 2014, now U.S. Pat. No. 9,762,558, which claims the benefit of U.S. Provisional Patent Application Ser. No. 61/777,467, titled "Wireless Pairing of Personal Health Device with a Computing Device," filed on Mar. 12, 2013, the contents of each of which are incorporated herein by reference in their entireties.

FIELD

The embodiments disclosed herein relate to personal health devices, and more particularly to the wireless pairing of a personal health device with a computing device.

BACKGROUND

A user of a personal health device (PHD), such as a blood glucose monitor (BGM), may want to communicate the data stored on the PHD with a computing device to analyze the data or communicate the data to a medical professional such as a doctor. One existing technique to establish communications between a PHD and a computing device involves connecting the PHD to a computing device via a cable. To connect a PHD to a computing device wirelessly, however, one often has to synchronize or pair the PHD to the computing device. This pairing usually occurs by inputting a pre-set private key into one or both devices. Entering keys on devices with limited user interfaces, such as on BGMs and other PHDs, is typically difficult. Because of this difficulty, private keys are often set to an obvious number, such as 0000 or 1234. This increases the chance of someone guessing the private key. Further, the typing of a private key onto a device with limited user interfaces increases the chance of one or more mistakes occurring. Other existing pairing techniques include transmitting the key over radio frequency (RF) in clear text, thereby enabling an eavesdropper to obtain the pairing information easily.

SUMMARY

Some existing PHDs communicate with a computing device such as a smartphone. Conventional communication techniques, however, are plagued with security issues. For example, a common communication method used by existing PHDs include communicating via radio frequency (RF). This type of communication is usually not secure (e.g., there are no software keys exchanged) and is easy for an eavesdropper to intercept.

According to some aspects illustrated herein, a PHD transmits a private key to a computing device (such as a smartphone or tablet) via a first communication medium. The PHD receives, from the computing device via a second wireless communication medium (using the private key transmitted on the first communication medium), pairing information which may include a new private key. The PHD can then securely pair to the computing device.

Examples of the first communication medium include light, sound, a display screen, a barcode, and/or a wired connection such as a cable. The second communication medium may be a wireless communication channel, such as Bluetooth®, Bluetooth Low Energy®, WiFi, or Zigbee®.

With respect to an embodiment in which the first communication medium is light (visible or non-visible spectrum), an LED of the PHD displays an optical signal for the computing device. The optical signal is a representation of the private key. The computing device obtains the private key when receiving the optical signal (e.g., via an optical sensor on the computing device, such as a camera or photodiode). The pairing can then occur using the private key on the second communication medium.

With respect to an embodiment in which the first communication medium is sound (auditory frequencies or ultrasonic), a speaker or audio component of the PHD plays an audio signal representing the private key. The computing device obtains the private key when receiving the audio signal (e.g., via a microphone of the computing device). The pairing can then occur using the private key on the second communication medium.

With respect to an embodiment in which the first communication medium is a display screen, the PHD can display a pattern on its display screen. The pattern is a representation of the private key. The computing device can capture the pattern (e.g., via its camera) and decode the pattern to obtain the private key. The pairing can then occur using the private key on the second communication medium.

With respect to an embodiment in which the first communication medium is a barcode, the PHD can have a barcode label. The barcode is a representation of or is the private key. The computing device can capture the barcode (e.g., via its camera or a laser scanner) and obtain the private key. The pairing can then occur using the private key on the second communication medium.

With respect to an embodiment in which the first communication medium is a wired connection, the PHD can communicate the private key to the computing device via the wired connection. The pairing can then occur using the private key on the second communication medium.

In one embodiment, using NFC, the computing device can read an embedded RFID tag on the PHD to obtain the private key.

The PHD may generate the private key (e.g., via a pseudorandom key generator). In an embodiment, the pairing of the PHD to the computing device includes changing the private key once both devices have the first private key, for added security.

In some embodiments, the PHD is put into a mode to initiate pairing. This may be via the push of a button on the PHD (e.g., by the user), or it may occur automatically, or it may occur in response to a message from the computing device. Further, in an embodiment the computing device can be in a mode of listening for pairing when the two devices first begin communicating.

These and other aspects and embodiments will be apparent to those of ordinary skill in the art by reference to the following detailed description and the accompanying drawings.

BRIEF DESCRIPTION OF THE DRAWINGS

The presently disclosed embodiments will be further explained with reference to the attached drawings, wherein like structures are referred to by like numerals throughout the several views. The drawings shown are not necessarily to scale, with emphasis instead generally being placed upon illustrating the principles of the presently disclosed embodiments.

FIG. 6B shows a block diagram of an embodiment of the computing device of FIG. 1 communicating with the BGM using NFC according to the present disclosure.

Figure 1:
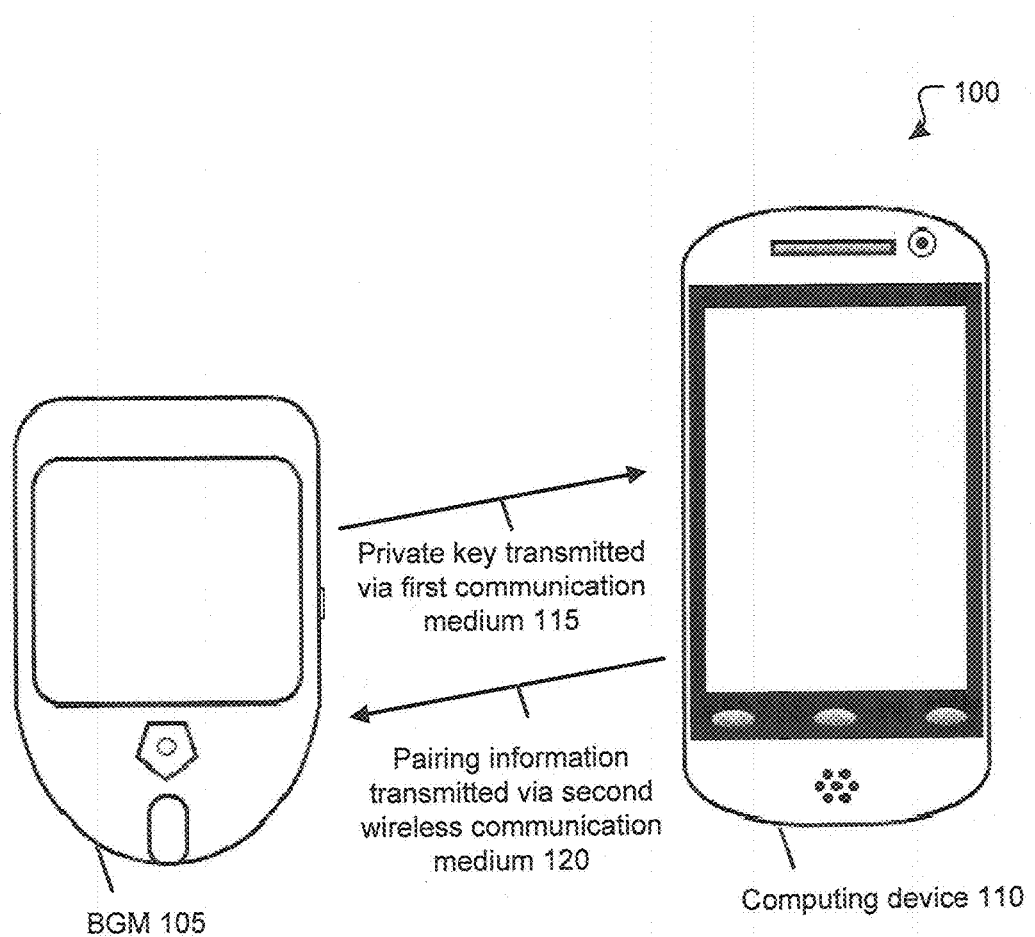
FIG. 1 shows a block diagram of an embodiment of a system including a blood glucose monitor (BGM) in communication with a computing device according to the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Among other things, for example, subject matter may be embodied as methods, devices, components, or systems. Accordingly, embodiments may, for example, take the form of hardware, software, firmware or any combination thereof. The following detailed description is, therefore, not intended to be taken in a limiting sense.

The present disclosure is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

Throughout the specification and claims, terms may have nuanced meanings suggested or implied in context beyond an explicitly stated meaning. Likewise, the phrase "In an embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The embodiments disclosed herein relate to securely pairing a personal health device (PHD) to a computing device. Non-limiting examples of a PHD include, but are not limited to, a blood glucose monitor (BGM), an infusion pump (e.g., an insulin pump, smart insulin pens, or similar devices), a blood pressure cuff, a pulse oximeter, a peak flow device, HbA1c device, alcohol breathalyzer, cholesterol monitor, hematocrit monitor, echocardiogram sensors, respiration monitor, continuous blood glucose monitor, digital thermometer, electronic pill boxes, or similar devices, pedometers, heart rate monitors, baby monitors (remote cameras or microphones), electronic wallet, vehicle key fob, activity monitors, emergency beacon, or similar devices. Non-limiting examples of a computing device include, but are not limited to, a computer, a laptop, a tablet, a smartphone, a digital camera, a television, a digital assistant, vehicle dashboard, smart A/V devices (e.g., DVD/Blueray player), electronics glass, vehicle heads-up displays, video projectors, or similar devices. Although described herein with respect to a BGM, the description herein can be applied to any PHD. The secure pairing of the PHD to a computing device virtually eliminates eavesdropping during the pairing process and greatly enhances the reliability of the communications between the two devices.

Figure 2:
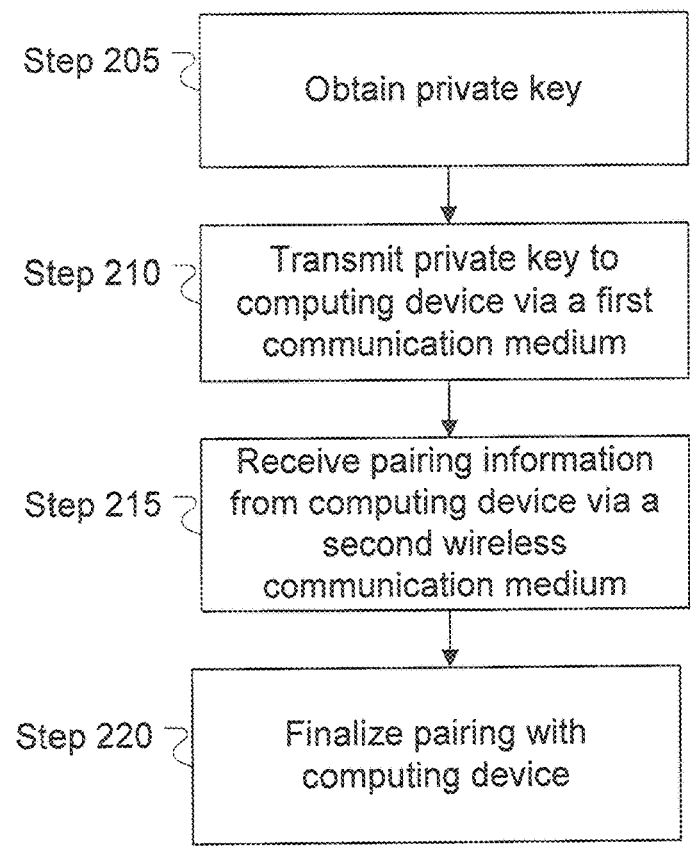
FIG. 2 shows an embodiment of method steps performed by the BGM according to the present disclosure.

FIG. 1 shows an embodiment of a system 100 including a BGM 105 (or any other PHD) in communication with a computing device 110 such as a smartphone. FIG. 2 shows an embodiment of steps performed by the BGM 105. The BGM 105 obtains a private key for use in communication with the computing device 110 (Step 205). The BGM 105 can obtain the private key by, for example, generating the private key (e.g., via a random or pseudorandom key generator), receiving the private key as input from a user, and/or reading the private key (e.g., via a scanning mechanism or via a digital camera). As described in more detail below, the BGM 105 transmits the private key to the computing device 110 via a first communication medium 115 (Step 210). In an embodiment, the BGM 105 receives pairing information from the computing device 110 via a second wireless communication medium 120 (Step 215). Examples of wireless communication channels include, but are not limited to, radio frequency (RF), such as WiFi, Bluetooth®, Bluetooth Smart®, ANT/ANT+®, ZigBee®, cellular, Near Field Communication (NFC), optical (e.g., barcode, IRDA, OCR, or similar devices), sound (e.g., ultrasonic, subsonic/vibratory, or similar sounds), magnetic, thermal, electrical (e.g., resistance, impedance, voltage, current) or similar channels. The BGM 105 then finalizes the pairing with the computing device 110 (Step 220). The system 100 therefore enables a "mixed-mode" method of pairing between the BGM 105 and the computing device 110, as different communication channels or mediums are used to communicate the private key and the pairing information between the devices 105, 110.

As a brief background on Bluetooth®, many of the services offered over Bluetooth® can expose private data or allow the connecting party to control the Bluetooth® device. For security reasons, it is necessary to be able to recognize specific devices and thus enable control over which devices are allowed to connect to a given Bluetooth® device. At the same time, it is useful for Bluetooth® devices to be able to establish a connection without user intervention (for example, as soon as they are in range). To resolve this conflict, Bluetooth® uses a process called bonding, and a bond is created through a process called pairing. The pairing process is triggered either by a specific request from a user to create a bond (for example, the user explicitly requests to "Add a Bluetooth® device"), or it is triggered automatically when connecting to a service where (for the first time) the identity of a device is required for security purposes.

Pairing often involves some level of user interaction; this user interaction is the basis for confirming the identity of the devices. Once pairing successfully completes, a bond will have been formed between the two devices, enabling those two devices to connect to each other in the future without requiring the pairing process in order to confirm the identity of the devices. When desired, the bonding relationship can later be removed by the user.

During the pairing process, the two devices involved establish a relationship by creating a "shared secret" known as a "link key" or "private key". If a private key is stored by both devices, they are said to be paired or bonded. A device that wants to communicate only with a bonded device can cryptographically authenticate the identity of the other device, and so be sure that it is the same device it previously paired with. Once a private key has been generated and shared, an authenticated Asynchronous Connection-Less (ACL) link between the devices may be encrypted so that the data that they exchange over the airwaves is protected against eavesdropping. Bluetooth® services generally require either encryption or authentication, and as such require pairing before they allow a remote device to use the given service.

Figure 3:
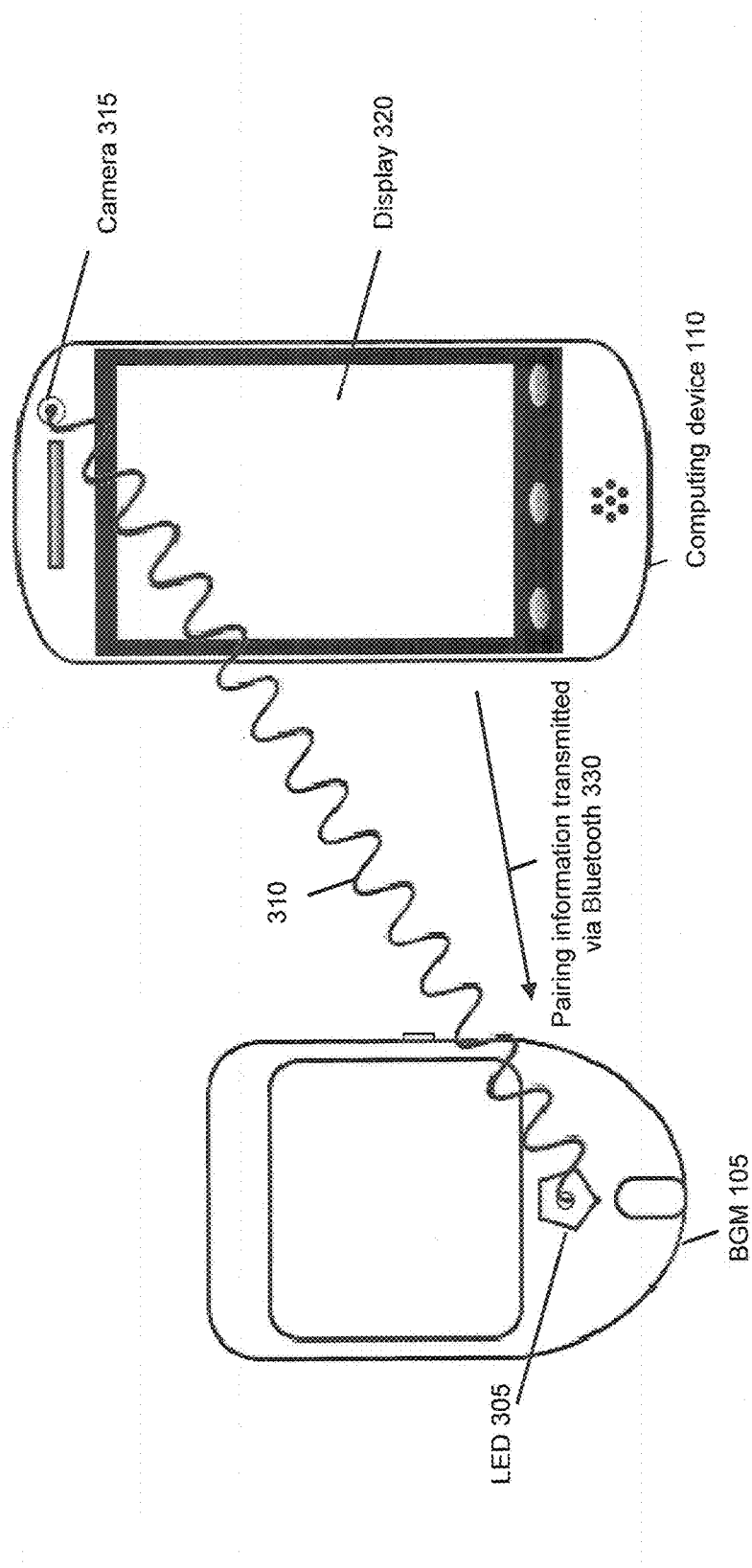
FIG. 3 shows a block diagram of an embodiment of the BGM of FIG. 1 emitting a light pairing private key transmission according to the present disclosure.

FIG. 3 shows a block diagram of BGM 105 emitting a light pairing private key transmission. The computing device 110 is listening for pairing and the BGM 105 is in a mode to initiate pairing. In an embodiment, the user of the BGM 105 initiates an action (such as pressing a button) to put the BGM 105 in a mode to initiate pairing. Alternatively, the BGM 105 automatically transitions to a mode to initiate pairing. Similarly, a user of the computing device 110 can perform an action to put the computing device 110 in a mode of listening for pairing or the computing device 110 can automatically transition to such a mode.

In an embodiment, the BGM 105 includes a Light Emitting Diode (LED) 305. The LED 305 may be an eject button indicator on the BGM 105 or another dual function LED or a dedicated LED for this function. As described above, the BGM 105 generates or obtains a private key (e.g., the BGM 105 uses a preset private key). The BGM 105 transmits (e.g., flashes) a light signal 310 corresponding to the private key. The light signal 310 may or may not be in the visible spectrum. The light signal 310 (also referred to below as an optical signal 310) can be a single wavelength or multi-wavelength. Multi-wavelength light signal 310 can encode a signal in base-N, where N−1 is the number of wavelengths available. In an embodiment, the signal 310 can be combined with other encoding methods, such as amplitude modulation (AM) or frequency modulation (FM).

The computing device 110 receives the light signal 310, such as via its camera 315 or other photo-sensing element existing on the computing device 110 (e.g., a photodiode or the light sensor on the device 110 that is used to adjust the brightness of the display 320). The computing device 110 can then determine the private key from the light signal 310. In an embodiment, the computing device 110 utilizes the received private key to send encrypted pairing information 330 out via Bluetooth® (or some second communication medium different than the first communication medium (optic)). The BGM 105 is the only other device that knows the private key and therefore is the only device that can decrypt the Bluetooth® message. The BGM 105 decrypts the Bluetooth® message and finalizes the pairing over the Bluetooth® secure link.

In an embodiment, the computing device 110 changes the private key after receiving the light signal 310. In this embodiment, the computing device 110 transmits the new private key (e.g., via Bluetooth®) to the BGM 105 by encrypting the new key data with the original private key sent by the BGM 105. The BGM 105 and the computing device 110 can then switch to the newly established private key.

By transmitting a private key over an optical signal 310, an eavesdropper would have to be physically close to the BGM 105 (closer than a straight Bluetooth®/RF pairing), and the eavesdropper's device would have to have the capability to receive the optical signal 310 and be in the line of sight of the BGM 105 (Bluetooth®/RF pairing doesn't require line of sight) to successfully obtain the private key. The eavesdropper would also need to be expecting a mixed-mode method of pairing that differs from the typical near field communication (NFC) when using Bluetooth®.

Figure 4:
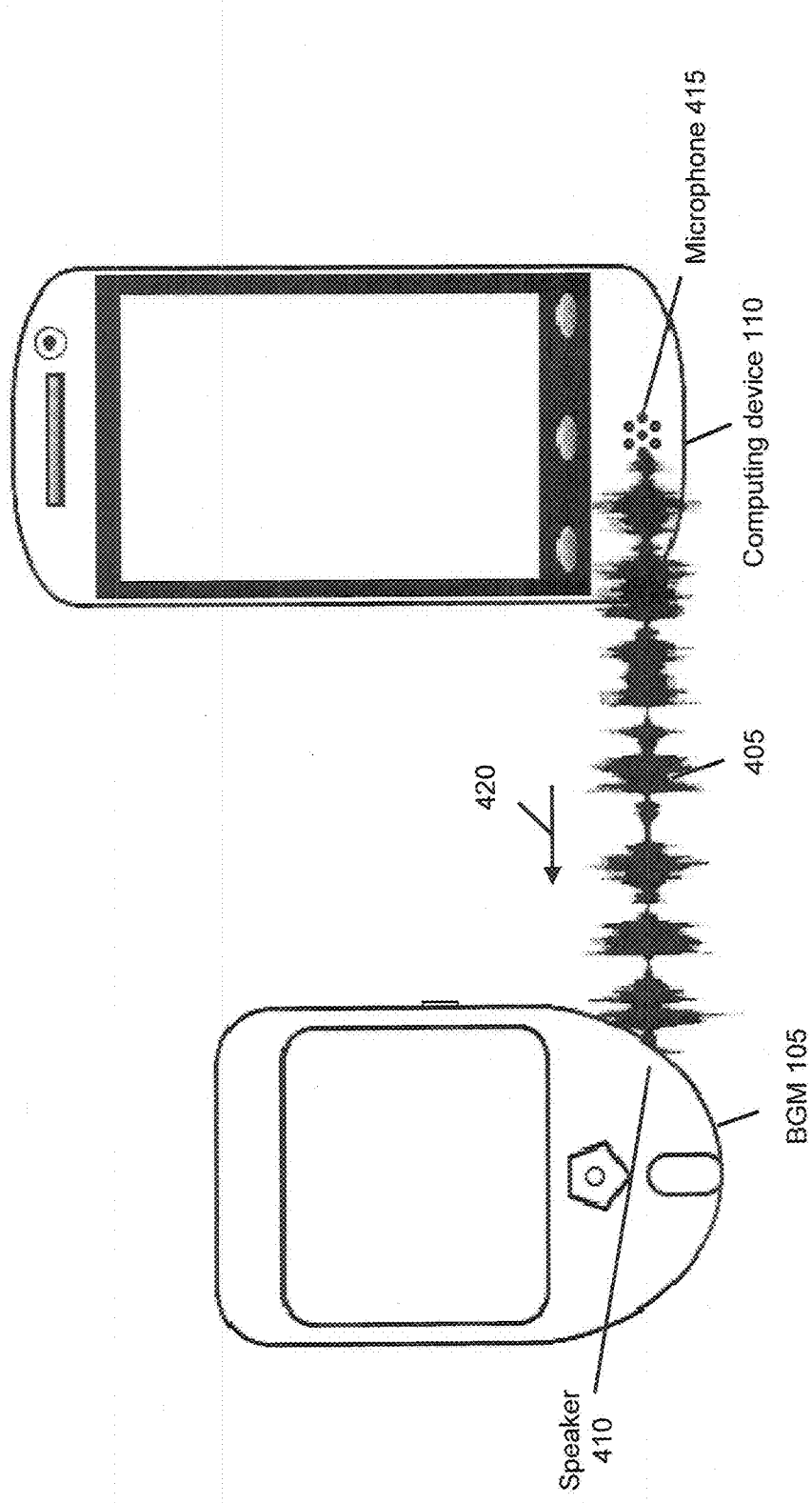
FIG. 4 shows a block diagram of an embodiment of the BGM of FIG. 1 resonating an audio signal to transmit the private key according to the present disclosure.

FIG. 4 shows a block diagram of the BGM 105 resonating an audio signal 405 to transmit the private key. As described above, the computing device 110 is listening for pairing and the BGM 105 is in a mode to initiate pairing. In an embodiment, the audio signal 405 emanates from a speaker or other audio device 410 (e.g., an internal speaker 410 located inside the BGM 105 or an external speaker in communication with the BGM 105). The audio signal 405 may be in the audible range or may be in the non-audible range (e.g., ultrasonic range).

As stated above, the BGM 105 generates or obtains a private key. The BGM 105 resonates an existing beeper/speaker 410/piezo in a digital fashion to transmit the private key in audio signal 405. The computing device 110 receives the audio signal 405 via microphone 415 or other vibration sensing element existing on the computing device 110. The computing device 110 converts the audio signal 405 to the private key and uses the received private key to send encrypted pairing information 420 out via Bluetooth® (or some second communication medium different than the first communication medium (audio)). The BGM 105 is the only other device that can decrypt the Bluetooth® message and finalize the pairing over the Bluetooth® secure link.

As stated above, the computing device 110 can change the private encryption key after receiving the audio signal 405. By transmitting a private key over an audio signal, an eavesdropper would need to be physically close to the BGM 105 (closer than a straight Bluetooth®/RF pairing) and utilize a device that has the capability of receiving the audio signal 405. The eavesdropper would also need to be expecting a mixed-mode method of pairing that differs from the typical NFC when using Bluetooth®.

Figure 5:
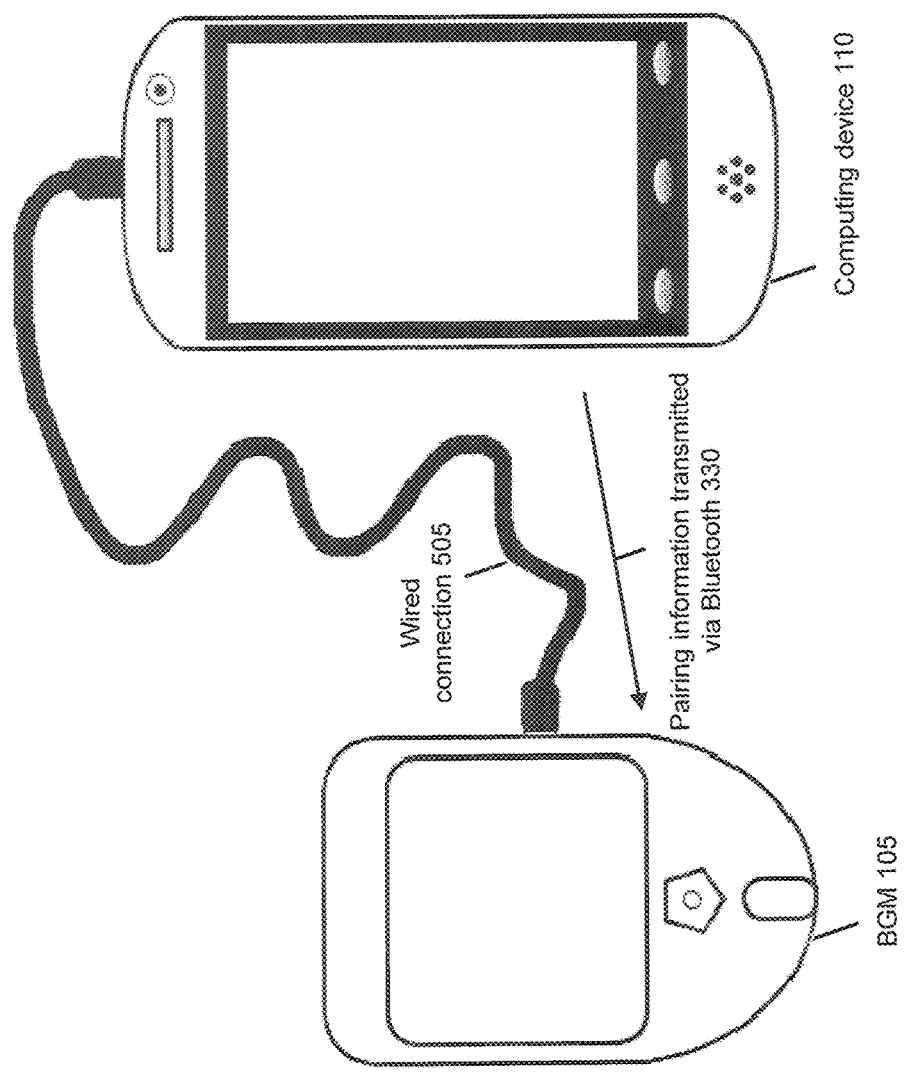
FIG. 5 shows a block diagram of an embodiment of the BGM of FIG. 1 communicating with the computing device over a wired connection according to the present disclosure.

FIG. 5 shows a block diagram of the BGM 105 communicating with the computing device 110 over a wired connection 505. As described above, the computing device 110 is listening for pairing and the BGM 105 is in a mode to initiate pairing. The BGM 105 generates or obtains a private key. The BGM 105 digitally transmits the private key over wired connection 505. Examples of the wired connection 505 include, but are not limited to, a USB cable, a serial cable, an RS-232 cable, fiber optic cable, or any other physical communications link capable to physically connect the BGM 105 and the computing device 110. In an embodiment, the wired connection 505 connects to and transmits data via the audio jack of the computing device 110 and/or the BGM 105. In an embodiment, the BGM 105 transmits additional pairing information required to pair the devices 105, 110 via Bluetooth® 330 (or, in another embodiment, over the wired connection 505) to the computing device 110.

The wired connection 505 between the BGM 105 and computing device 110 is removed, and the Bluetooth® link (or second communication medium) is now secure. As described above, the computing device 110 can now change the private encryption key and transmit this key to the BGM 105. By transmitting a private key over a physical link 505, eavesdropping is completely eliminated. All Bluetooth® communications will be secure and encrypted.

Figure 6A:
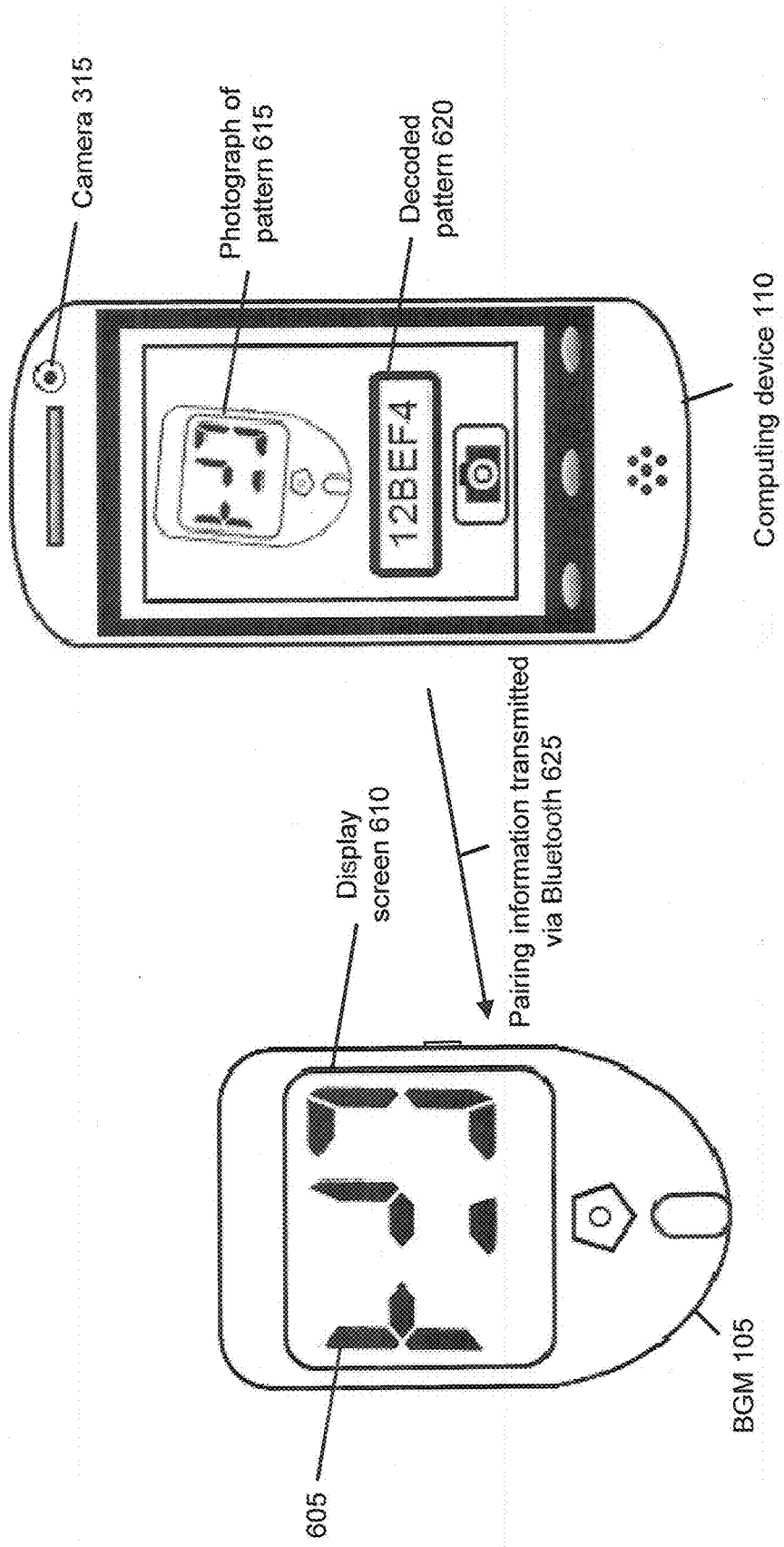
FIG. 6A shows a block diagram of an embodiment of the BGM of FIG. 1 communicating with the computing device using a pattern according to the present disclosure.

FIG. 6A shows a block diagram of the BGM 105 communicating with the computing device 110 using a pattern. The BGM 105 is in a mode to initiate pairing. The BGM 105 generates or obtains a private key. The BGM 105 displays the private key in the form of a pattern 605 on its display screen 610 (e.g., LCD display, dot matrix display, or similar devices). The pattern 605 may be one or more word(s), letter(s), symbol(s), graphic(s), video(s), animation(s), design(s), and/or arrangement(s) viewable on display screen 610. The computing device 110 uses its camera 315 to take a photograph 615 of the pattern. The computing device 110 determines, from the photograph 615, a decoded pattern 620. In an embodiment, the decoded pattern 620, shown in FIG. 6 as pattern "12BEF4", is the private key. The computing device 110 users the private key to send encrypted pairing information 625 out via Bluetooth® (or some other second communication medium). The BGM 105 is the only other device that knows the private key and therefore is the only device that can decrypt the Bluetooth® message and finalize the pairing over the Bluetooth® secure link.

As described above, in an embodiment the computing device 110 can change the private encryption key and send the new private key via Bluetooth® to the BGM 105 by encrypting the new key data with the original private key sent by the BGM 105. At that point, both the BGM 105 and the computing device 110 can switch to the newly established private key.

By transmitting a private key by encoding the key into the display screen 610 of the BGM 105, an eavesdropper would need to be physically close to the BGM, be in the line of sight of the display screen 610, and know the method of encoding to be able to intercept the private key. The eavesdropper would also need to be expecting a mixed-mode method of pairing that differs from the typical NFC when using Bluetooth®.

In an embodiment, a preset private key is imprinted as a barcode and secured to the BGM 105 (e.g., on the back of the BGM 105). In an embodiment, the computing device 110 uses its camera 315 to read the barcode and determine the private key. The computing device 110 then uses the private key to send encrypted pairing information out via Bluetooth® (or some other second communication medium). As described above, the computing device 110 can opt to change the private encryption key and send the new private key via Bluetooth® to the BGM by encrypting the new key data with the original private key sent by the BGM 105. At that point, both the BGM 105 and the computing device 110 can switch to the newly established private key.

By reading a private key by using an imprinted barcode on the BGM 105, an eavesdropper would need to be physically close to the BGM 105 and would need to be in the line of sight of the barcode to intercept the private key. The eavesdropper would also need to be expecting a mixed-mode method of pairing that differs from the typical NFC when using Bluetooth®.

Referring to FIG. 6B, in one embodiment, using NFC 605, the computing device 110 can read an embedded RFID tag on the PHD 105 to obtain the private key. Unlike a conventional approach of using an NFC device to connect to another NFC device, this embodiment connects an NFC device to an RFID device.

As described herein, the existing components of the smartphone and the PHD are utilized to facilitate a secure, mixed-mode pairing. In other words, electronics not already present in existing PHDs and computing devices are not needed to utilize this secure, mixed-mode pairing. Unlike the tap-to-pair type of configuration, in which two device owners tap each of their devices together to pair them and which requires additional electronics and is therefore more costly, the above described pairing does not need specialized hardware, thereby making this a more cost-effective solution.

The different embodiments described above can be implemented via, for example, firmware or software downloaded onto a BGM 105 and the computing device 110. In an embodiment, the computing device 110 (and/or BGM 105) downloads a software application (also referred to as an "app") from, e.g., an online app store. In an embodiment, a manufacturer of the BGM 105 would manufacture the BGM 105 with the capability of one or more of the previously described embodiments.

As described above, the PHD can communicate the data stored on the PHD with a computing device if the user wants to analyze and/or graph the data from the PHD and/or if the user wants to communicate the data to a medical professional such as a doctor. In an embodiment, the user uses the PHD to control another PHD by pairing the first PHD with the second PHD. For example, a diabetic user can pair the user's BGM with the user's insulin pump. The user can then test his blood sugar using his BGM, and can adjust the amount of insulin delivered to the user by the user's insulin pump via one or more of the described pairing techniques. In an embodiment, the PHD (e.g., BGM 105) has an option or display screen in which the user can select which device out of many to which the user wants to pair the BGM.

Figure 7:
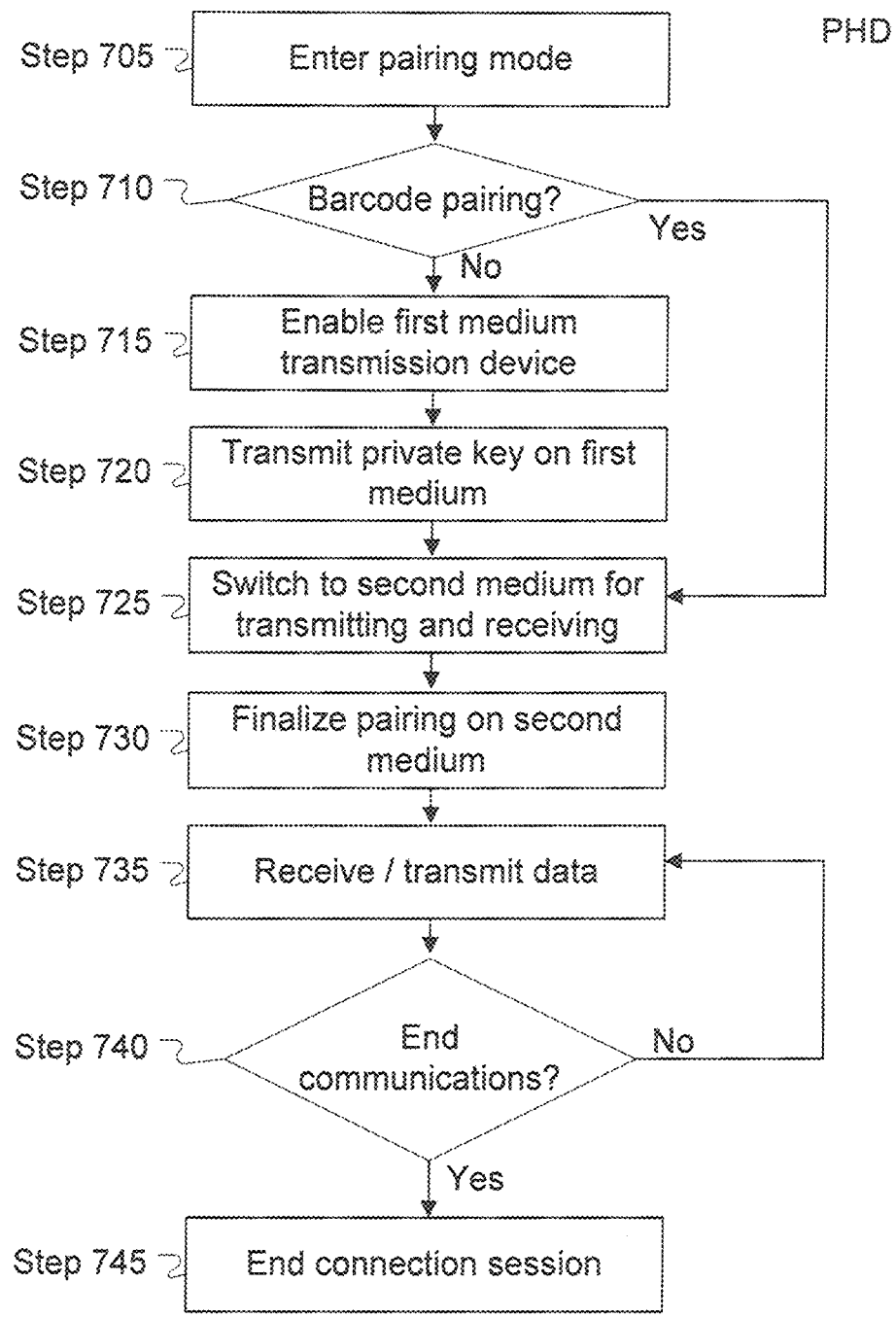
FIG. 7 shows an embodiment of method steps performed by a personal health device (PHD) according to the present disclosure.

FIG. 7 shows an embodiment of method steps performed by the PHD (e.g., BGM 105) according to the present disclosure. The PHD 105 is configured to enter a pairing mode (Step 705). In an embodiment, the user configures the PHD 105 into the pairing mode to pair with a computing device. For example, the user may press a button on the PHD 105 to put the PHD 105 into the pairing mode.

If the PHD 105 is designed for barcode pairing (Step 710), then the PHD 105 transitions to a second communication medium for transmitting and receiving (Step 725). If not, the PHD 105 enables a first communication medium transmission device (Step 715), such as one or more LEDs, a beeper, a speaker or piezo, a wired cable, or an LCD pattern, depending on the profile for the PHD 105. The PHD 105 then transmits a private key on the first communication medium (Step 720). The PHD 105 switches to the second communication medium (Step 725) and finalizes the pairing with the computing device 110 on the second communication medium (Step 730). As described above, the second communication medium may be, for example, RF (WiFi, Bluetooth®, Bluetooth Smart®, ANT/ANT+®, ZigBee®, NFC®, or similar medium). The PHD 105 can then receive or transmit data over the second communication medium (Step 735). The PHD 105 ends the communication session at a later point in time, such as when the data has been transmitted and/or received (Steps 740-745).

Figure 8:
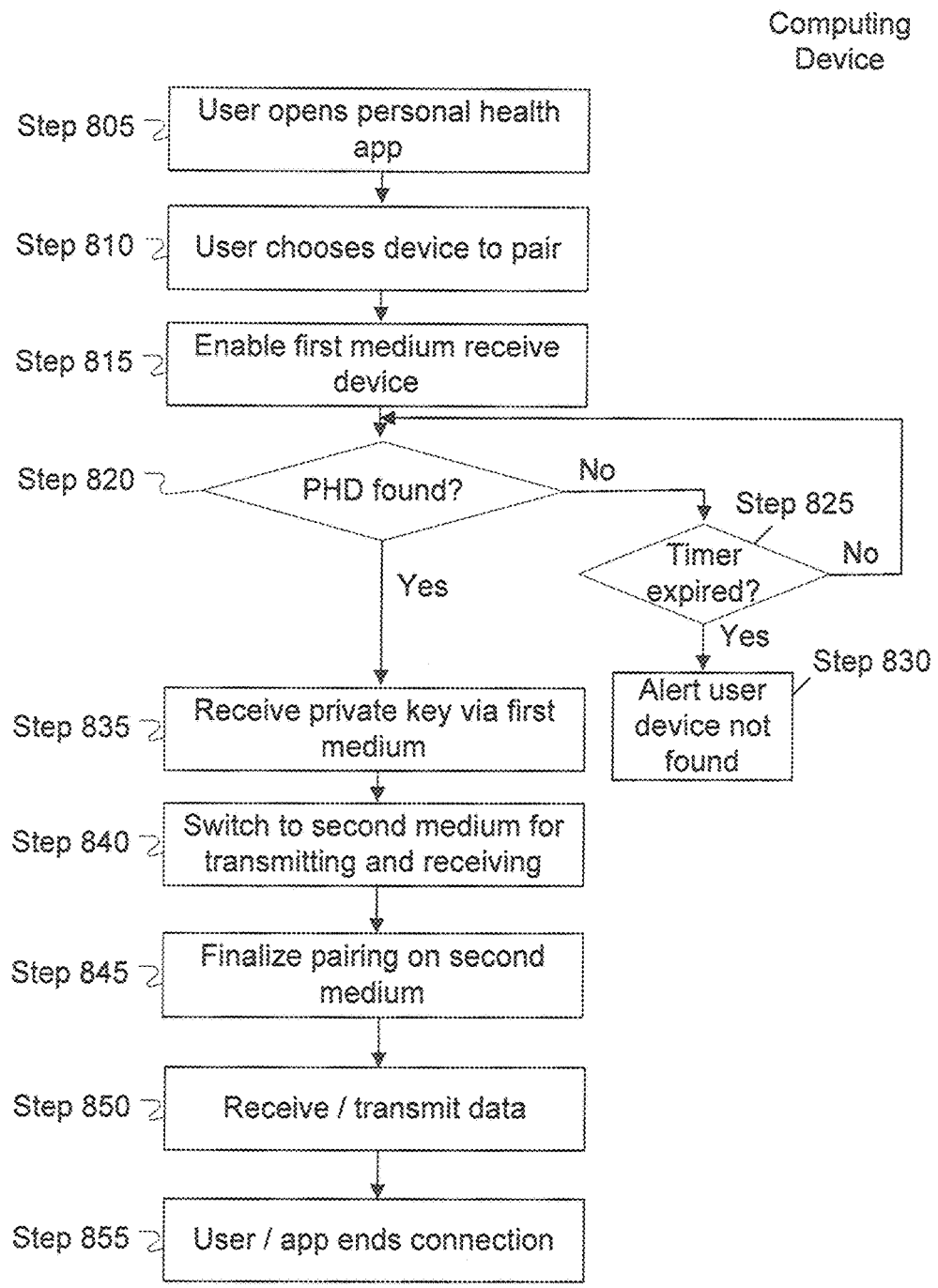
FIG. 8 shows an embodiment of method steps performed by the computing device according to the present disclosure.

FIG. 8 shows an embodiment of method steps performed by the computing device according to the present disclosure. The user of the computing device 110 can open a personal health app (Step 805). In an embodiment, the user chooses a device to pair (Step 810). The order of which device (PHD 105 or computing device 110) is put into the pairing mode first may not be important. If the computing device 110 has a profile for the PHD 105 that dictates a barcode, then the computing device 110 will use a camera or barcode scanner to read the barcoded label on the PHD 105. If the profile for the PHD 105 contains a different medium other than the barcode, then the computing device 110 enables a first medium receive device (Step 815). The first medium receive device may be a photo sensor, a camera, a microphone, or a wired cable. The computing device 110 searches for the PHD 105 signal on the receiver for a period of time (Steps 820-825). If the PHD 105 is not found, the computing device 110 can alert the user that the PHD 105 was not found (Step 830). If the PHD 105 was found in Step 820, the computing device 110 receives the private key via the first communication medium (Step 835).

The computing device 110 then switches to the second communication medium for transmitting and/or receiving (Step 840). In an embodiment, the computing device 110 finalizes the pairing on the second communication medium (Step 845). The computing device 110 receives/transmits data (Step 850) until the user or app ends the connection (Step 855).

There are several types of devices that can be paired together. As stated above, one example includes, but is not limited to, a BGM paired with a smartphone or tablet. The BGM can also be paired with, for example but not limited to, an insulin pump or an insulin pen. As stated above, a blood pressure cuff can be paired with, for example but not limited to, a smartphone or tablet. Another example pairing includes, but is not limited to, a pulse oximeter, blood pressure cuffs, insulin pumps, heart rate monitors, paired with a smartphone or tablet.

The pairing of devices can help, for instance but not limited to, people with diabetes, people with high blood pressure, and/or people with saturation of their hemoglobin.

Computing device 110 may be capable of sending or receiving signals, such as via a wired or wireless network, or may be capable of processing or storing signals, such as in memory as physical memory states. Computing device 110 may include one or more central processing units and memory. Computing device 110 may also include one or more mass storage devices, one or more power supplies, one or more wired or wireless network interfaces, one or more input/output interfaces, or one or more operating systems, such as iOS®, Android®, Windows® XP®, Windows® 7, Windows® 8, Mac® OS X®, Unix®, Linux®, FreeBSD®, or the like. In an embodiment, the computing device 110 hosts or is in communication with a database. The database may be stored locally or remotely from the computing device 110.

A network may couple devices so that communications may be exchanged, such as between a computing device 110 and a PHD. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or similar networks. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE)®, LTE Advanced®, Wideband Code Division Multiple Access (WCDMA), Bluetooth®, 802.11b/g/n, or similar network access technologies. A wireless network may include virtually any type of wireless communication mechanism by which signals may be communicated between devices, such as a client device or a computing device, between or within a network, or the like.

Figure 9:
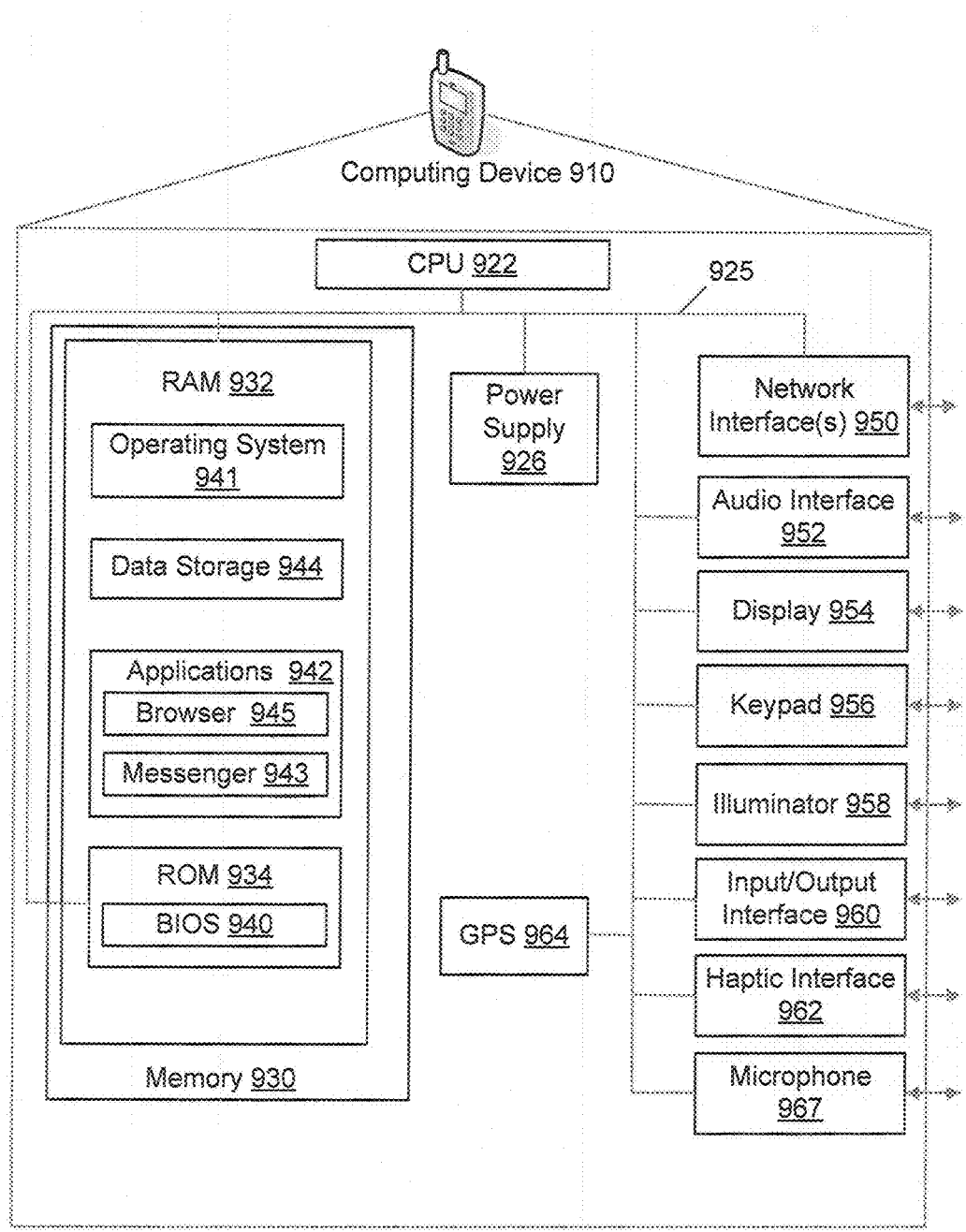
FIG. 9 shows a block diagram of an embodiment of a computing device according to the present disclosure.

In an embodiment and as described above, the computing device 110 is a smartphone. In an embodiment, the computing device 110 is a tablet. The computing device 110 may be a computer, a laptop, a set top box, or similar devices. As shown in FIG. 9, computing device 910 (and/or PHD 105) may include one or more processing units (also referred to herein as computer processing units (CPUs)) 922, which interface with at least one computer bus 925. A memory 930 can be persistent storage and interfaces with the computer bus 925. The memory 930 includes RAM 932 and ROM 934. ROM 934 includes a BIOS 940. Memory 930 interfaces with computer bus 925 so as to provide information stored in memory 930 to CPU 922 during execution of software programs such as an operating system 941, application programs 942, device drivers, and software modules 943, 945 that comprise program code, and/or computer-executable process steps, incorporating functionality described herein, e.g., one or more of process flows described herein. CPU 922 first loads computer-executable process steps from storage, e.g., memory 932, data storage medium/media 944, removable media drive, and/or other storage device. CPU 922 can then execute the stored process steps in order to execute the loaded computer-executable process steps. Stored data, e.g., data stored by a storage device, can be accessed by CPU 922 during the execution of computer-executable process steps.

Persistent storage medium/media 944 is a computer readable storage medium(s) that can be used to store software and data, e.g., an operating system and one or more application programs. Persistent storage medium/media 944 can also be used to store device drivers, such as one or more of a digital camera driver, monitor driver, printer driver, scanner driver, or other device drivers, web pages, content files, playlists and other files. Persistent storage medium/media 944 can further include program modules and data files used to implement one or more embodiments of the present disclosure.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Computing device 910 can also include one or more of a power supply 926, network interface 950, audio interface 952, a display 954 (e.g., a monitor or screen), keypad 956, illuminator 958, Input/Output (I/O) interface 960, a haptic interface 962, a GPS 964, a microphone 967, a video camera, TV/radio tuner, audio/video capture card, sound card, analog audio input with A/D converter, modem, digital media input (HDMI, optical link), digital I/O ports (RS232, USB, FireWire, Thunderbolt), expansion slots (PCMCIA, ExpressCard, PCI, PCIe).

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more computing devices, or be loaded and executed by one or more computing devices. One or more modules may be grouped into an engine or an application.

Thus, in an embodiment, the PHD includes a processor and a storage medium for tangibly storing thereon program logic for execution by the processor. The program logic includes transmitting logic executed by the processor for communicating, to a computing device via a first communication medium, a private key. The program logic also includes receiving logic executed by the processor for receiving, from the computing device via a second wireless communication medium, pairing information comprising the private key. The program logic can also include pairing logic executed by the processor for pairing the personal health device to the computing device.

In an embodiment, a method includes transmitting, by a personal health device to a computing device via a first communication medium, a private key; receiving, by the personal health device from the computing device via a second wireless communication medium, pairing information comprising the private key; and pairing, by the personal health device, the personal health device to the computing device.

In an embodiment, a method includes receiving, by a computing device from a personal health device via a first communication medium, a private key, transmitting, by the computing device to the personal health device via a second wireless communication medium, pairing information comprising the private key; and establishing, by the computing device with the personal health device, a pairing between the personal health device and the computing device over the second communication medium.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the computing device or a server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A communication system comprising:
   a personal health device comprising a hardware processor and a non-transitory computer readable storage medium for tangibly storing thereon program logic for execution by the hardware processor; and
   a computing device in communication with the personal health device via first communication medium and a second communication medium, wherein the program logic comprises:
      transmitting logic executed by the hardware processor for communicating a private key to the computing device via a first communication medium transmission device configured to communicate the first communication medium in the form of an optical signal, an audio signal, or a pattern displayed on a display device, the private key being represented by the optical signal, the audio signal, or the pattern;
      receiving logic executed by the hardware processor for receiving, from the computing device via the second communication medium comprising a wireless communication channel and being different than the first communication medium, pairing information encrypted using the private key; and
      pairing logic executed by the hardware processor for pairing the personal health device to the computing device upon receiving of the pairing information.

2. The communication system of claim 1, wherein the transmitting logic for communicating, to the computing device via the first communication medium transmission device, the private key further comprises transmitting logic executed by the hardware processor for transmitting, to the computing device, the optical signal.

3. The communication system of claim 1, wherein the transmitting logic for communicating, to the computing device via the first communication medium transmission device, the private key further comprises transmitting logic executed by the hardware processor for transmitting, to the computing device, the audio signal.

4. The communication system of claim 1, wherein the transmitting logic for communicating, to the computing device via the first communication medium transmission device, the private key further comprises displaying logic executed by the hardware processor for displaying the pattern, on the display device.

5. The communication system of claim 1, wherein the transmitting logic for communicating, to the computing device via the first communication medium transmission device, the private key further comprises transmitting logic executed by the hardware processor for transmitting, to the computing device over a wired communication link, the private key.

6. The communication system of claim 1, wherein the pairing logic further comprises key changing logic executed by the hardware processor for changing the private key.

7. The communication system of claim 1, further comprising generating logic executed by the hardware processor for generating the private key.

8. The communication system of claim 1, further comprising a barcode for communication to the computing device via the first communication medium.

9. The communication system of claim 1, further comprising pairing initiation logic executed by the hardware processor for configuring the personal health device to be in a mode to initiate pairing.

10. The communication system of claim 1, wherein the personal health device does not comprise a near field communication (NFC) chip.

11. The communication system of claim 1, further comprising an embedded RFID tag for communicating the private key to the computing device via the first communication medium using near field communication.

12. A method comprising:
   receiving, by a computing device, a private key from a hardware processor of a personal health device via a first communication medium transmission device configured to communicate a first communication medium in the form of an optical signal, an audio signal, or a pattern displayed on a display device, the private key being represented by the optical signal, the audio signal, or the pattern; and
   transmitting, by the computing device, pairing information encrypted using the private key to the hardware processor of the personal health device via a second communication medium different than the first communication medium,
   wherein upon receiving of the pairing information by the hardware processor of the personal health device, the hardware processor of the personal health device is paired to the computing device using the pairing information comprising the private key.

13. The method of claim 12, wherein the pairing the personal health device to the computing device further comprises changing the private key.

14. The method of claim 12, wherein the private key is generated by the hardware processor of the personal health device.

15. The method of claim 12, wherein the private key further comprises enabling capture of a barcode on the personal health device by the computing device.

16. The method of claim 12, further comprising configuring computing device to enable the personal health device to be in a mode to initiate pairing.

17. The method of claim 12, wherein the receiving step further comprises receiving, by the computing device, an embedded RFID tag via near field communication.

* * * * *